(12) United States Patent
Epasto et al.

(10) Patent No.: US 11,100,688 B2
(45) Date of Patent: Aug. 24, 2021

(54) METHODS AND SYSTEMS FOR ENCODING GRAPHS

(71) Applicant: Google LLC, Mountain View, CA (US)

(72) Inventors: Alessandro Epasto, New York, NY (US); Bryan Perozzi, Cranford, NJ (US)

(73) Assignee: Google LLC, Mountain View, CA (US)

( * ) Notice: Subject to any disclaimer, the term of this patent is extended or adjusted under 35 U.S.C. 154(b) by 206 days.

(21) Appl. No.: 16/523,612

(22) Filed: Jul. 26, 2019

(65) Prior Publication Data

US 2020/0035002 A1     Jan. 30, 2020

Related U.S. Application Data

(60) Provisional application No. 62/703,524, filed on Jul. 26, 2018.

(51) Int. Cl.
    *G06F 16/901*     (2019.01)
    *G06T 9/00*     (2006.01)
    *G06T 11/20*     (2006.01)

(52) U.S. Cl.
    CPC ........ *G06T 11/206* (2013.01); *G06F 16/9024* (2019.01); *G06T 9/00* (2013.01); *G06T 2200/24* (2013.01)

(58) Field of Classification Search
    CPC ..... G06T 11/206; G06T 9/00; G06T 2200/24; G06T 9/001; G06F 16/9024
    See application file for complete search history.

(56) References Cited

U.S. PATENT DOCUMENTS

| | | | | |
|---|---|---|---|---|
| 9,384,571 B1* | 7/2016 | Covell | ............... | G06Q 10/10 |
| 9,442,994 B2* | 9/2016 | Carvalho | ............... | G06F 16/27 |
| 9,471,606 B1* | 10/2016 | Pedregal | ............... | G06F 16/24 |
| 9,779,150 B1* | 10/2017 | Sherman | ............... | G06F 16/26 |
| 2002/0087275 A1* | 7/2002 | Kim | ............... | G16B 45/00 |
| | | | | 702/19 |
| 2005/0243736 A1* | 11/2005 | Faloutsos | ............... | G06Q 10/04 |
| | | | | 370/254 |
| 2013/0246328 A1* | 9/2013 | Sweeney | ............... | G06N 5/02 |
| | | | | 706/50 |
| 2015/0379409 A1* | 12/2015 | Hu | ............... | G06F 16/20 |
| | | | | 706/55 |
| 2017/0316082 A1* | 11/2017 | McQueary | ............... | G06F 16/9024 |

(Continued)

OTHER PUBLICATIONS

Abrahao et al, "A Separability Framework for Analyzing Community Structure", Association for Computing Machinery Transactions on Knowledge Discovery from Data, 25 pages.

(Continued)

*Primary Examiner* — Jorge A Casanova
(74) *Attorney, Agent, or Firm* — Dority & Manning, P.A.

(57) ABSTRACT

The present disclosure is directed to encoding graphs. In particular, the methods and systems of the present disclosure can: receive data describing a first graph; and for each node, of one or more nodes, of the first graph, determine, based at least in part on data describing a second graph, and for each of multiple nodes of the second graph corresponding to the node of the first graph, a representation of a role of the node of the multiple nodes in a community to which the node of the multiple nodes belongs.

19 Claims, 10 Drawing Sheets
(4 of 10 Drawing Sheet(s) Filed in Color)

(56) References Cited

U.S. PATENT DOCUMENTS

| | | | |
|---|---|---|---|
| 2018/0137667 A1* | 5/2018 | Kindelsberger | G06F 16/9024 |
| 2018/0203897 A1* | 7/2018 | Van Rest | G06F 16/9024 |
| 2019/0121810 A1* | 4/2019 | Zhuang | G06F 16/2365 |
| 2019/0130264 A1* | 5/2019 | Rossi | G06N 5/022 |

OTHER PUBLICATIONS

Abu-El-Haija et al, "Learning Edge Representations via Low-Rank Asymmetric Projections", arXiv:1705v4, Sep. 13, 2017, 10 pages.

Bastian et al, "Gephi: An Open Source Software for Exploring and Manipulating Networks", Conference on Weblogs and Social Media, May 17-20, 2009, San Jose, California, 2 pages.

Belkin et al, "Laplacian Eigenmaps and Spectral Techniques for Embedding and Clustering", Conference on Neural Information Processing Systems: Natural and Synthetic, Dec. 3-8, 2001, Vancouver, Canada, 7 pages.

Burt, "Structural Holes: The Social Structure of Competition", Harvard University Press, Cambridge, Massachusetts, 1992, 271 pages.

Buzun et al, "EgoLP: Fast and Distributed Community Detection in Billion-Node Social Networks", Conference on Data Mining, Dec. 14, 2014, Shenzhen, China, 8 pages.

Cao et al, "Deep Neural Networks for Learning Graph Representations", Conference on Artificial Intelligence, Feb. 12-17, 2016, Phoenix, Arizona, pp. 1145-1152.

Cavallari et al, "Learning Community Embedding with Community Detection and Node Embedding on Graphs", Conference on Information and Knowledge Management, Nov. 6-10, 2017, Singapore, Singapore, pp. 337-386.

Chen et al, "HARP: Hierarchical Representation Learning for Networks", arXiv:1706v2, Nov. 16, 2017, 8 pages.

Coscia et al, "Uncovering Hierarchical and Overlapping Communities with a Local-First Approach", Transactions on Knowledge Discover from Data, vol. 9, No. 1, Oct. 2014, 25 pages.

Delis et al, "Scalable link community detection: A local dispersion-aware approach", Conference on Big Data, Dec. 5-8, 2016, Washington, DC, 10 pages.

Dunbar et al, "Communication in Social Networks: Effects of Kinship, Network Size and Emotional Closeness", Personal Relationships, vol. 18, No. 3, Nov. 2010, pp. 439-452.

Epasto et al, "Ego-Net Community Mining Applied to Friend Suggestion", Very Large Data Bases, vol. 9, No. 4, 2015, pp. 324-335.

Epasto et al, "Ego-Splitting Framework: From Non-Overlapping to Overlapping Clusters", Conference on Knowledge Discovery and Data Mining, Aug. 13-17, 2017, Halifax, Nova Scotia, Canada, pp. 145-153.

Fortunato, "Community Detection in Graphs", arXiv:0906v2, Jan. 25, 2010, 103 pages.

Freeman, "Centered Graphs and the Structure of Ego Networks", Mathematical Social Sciences, 1982, pp. 291-304.

Girvan et al, "Community Structure in Social and Biological Networks", National Academy of Sciences of the United States of America, vol. 99, No. 12, pp. 7821-7826.

Grover et al, "node2vec: Scalable Feature Learning for Networks", arXiv:1607v1, Jul. 3, 2016, 10 pages.

Hsu et al, "Unsupervised Ranking using Graph Structures and Node Attributes", Conference on Web Search and Data Mining, Feb. 6-10, 2017, Cambridge, United Kingdom, pp. 771-779.

Huang et al, "Improving Word Representations via Global Context and Multiple Word Prototypes", Annual Meeting of the Association for Computational Linguistics, Jul. 8-14, 2012, Jeju, Republic of Korea, pp. 873-882.

Kumar et al, "Stochastic Models for the Web Graph", Symposium on Foundations of Computer Science, Nov. 12-14, 2000, Redondo Beach, California, pp. 57-65.

Lancichinetti et al, "Benchmarks for Testing Community Detection Algorithms on Directed and Weighted Graphs with Overlapping Communities", Physical Review, vol. 80, Aug. 2009, 8 pages.

Lattanzi et al, "Affiliation Networks", Symposium on Theory of Computing, May 31-Jun. 2, 2009, Bethesda, Maryland, pp. 427-434.

Leskovec et al, "Community Structure in Large Networks: Natural Cluster Sizes and the Absence of Large Well-Defined Clusters", arXiv:0810v1, Oct. 8, 2008, 66 pages.

Leskovec et al, "Empirical Comparison of Algorithms for Network Community Detection", arXiv:1004v1, Apr. 20, 2010, 11 pages.

Li et al, "User Profiling in an Ego Network: Co-Profiling Attributes and Relationships" World Wide Web Conference, Apr. 7-11, 2014, Seoul, South Korea, pp. 819-829.

McAuley et al, "Learning to Discover Social Circles in Ego Networks", Conference on Neural Information Processing Systems, Dec. 3-8, 2012, Lake Tahoe, Nevada, 9 pages.

Mikolov et al, "Distributed Representations of Words and Phrases and their Compositionality", Conference on Neural Information Processing Systems, Dec. 5-10, 2013, Lake Tahoe, Nevada, 9 pages.

Perozzi et al, "Focused Clustering and Outlier Detection in Large Attributed Graphs", Conference on Knowledge Discovery and Data Mining, Aug. 24-27, 2014, New York, New York, pp. 1346-1355.

Perozzi, "Local Modeling of Attributed Graphs: Algorithms and Applications", Stony Brook University, PhD dissertation, 2016, 127 pages.

Perozzi et al, "DeepWalk: Online Learning of Social Representations", arXiv:1403v2, Jun. 27, 2014, 10 pages.

Perozzi et al, "Don't Walk, Skip! Online Learning of Multi-scale Network Embeddings", arXiv:1605v2, Jun. 24, 2017, 8 pages.

Perozzi et al, "Exact Age Prediction in Social Networks", World Wide Web Conference, May 18-22, 2015, Florence, Italy, 2 pages.

Rees et al, "Overlapping Community Detection by Collective Friendship Group Inference", Conference on Advances in Social Networks Analysis and Mining, Aug. 9-11, 2010, Odense, Denmark, 5 pages.

Snap, "Stanford Large Network Dataset Collection", http://snap.stanford.edu/data, retrieved on Jul. 25, 2019, 6 pages.

Stark et al, "BioGRID: A General Repository for Interaction Datasets", Nucleic Acids Research, vol. 34, 2006, D535-D539.

Suaris et al, "An Algorithm for Quadrisection and its Application to Standard Cell Placement", Transactions on Circuits and Systems, vol. 35, Issue 3, 1988, pp. 294-303.

Tang et al, "LINE: Large-Scale Information Network Embedding", arXiv:1503v1, Mar. 12, 2015, 11 pages.

Tsitsulin et al, "VERSE: Versatile Graph Embeddings from Similarity Measures", arXiv:1803v1, Mar. 13, 2018, 10 pages.

Wang et al, "Community Preserving Network Embedding", Conference on Artificial Intelligence, Aug. 19-25, 2017, Melbourne, Australia, pp. 203-209.

Wasserman et al, "Social Network Analysis: Methods and Applications", Cambridge University Press, Cambridge, Massachusetts, 1994, 755 pages.

Yang et al, "Detecting Cohesive and 2-Mode Communities Indirected and Undirected Networks", arXiv:1401v1, Jan. 29, 2014.

Zheng et al, "From Node Embedding to Community Embedding", arXiv:1610v1, Oct. 31, 2016, 7 pages.

\* cited by examiner

Input:
  $G(V, E)$, a graph
  $w$, window size
  $d$, embedding size
  $\gamma$, walks per vertex
  $t$, walk length
  $\alpha$, learning rate
  $\lambda$, graph regularization coefficient
  $\mathcal{A}$, clustering algorithm for the ego-nets
  EMBEDFN, a graph embedding method which uses the dot-product similarity (e.g. DeepWalk, node2vec)

Output:
  $\Phi_{G_P}$ a matrix with one or more representations for each node
  $P2N$, a mapping of the rows of $\Phi_{G_P}$ to $V$ (the original nodes)

1: function SPLITTER($G$, EMBEDFN)
2:   $G_P \leftarrow$ PERSONAGRAPH($G, \mathcal{A}$)  ▷ Create the persona graph $G_P$ of $G$ using clustering algorithm $\mathcal{A}$ and method in [14].
3:   $P2N \leftarrow \emptyset$
4:   $\Phi_G \leftarrow$ EMBEDFN($G, w, d, \gamma, t$)   ▷ Embed original graph
5:   for each $v_o \in V$ do
6:     for each $v_j \in$ personas of $v_o$ do
7:       $\Phi_{G_P}(v_j) \leftarrow \Phi_G(v_o)$  ▷ Initialize $j$-th persona of $v_o$
8:       $P2N(v_j) \leftarrow v_o$
9:   for $i = 0$ to $\gamma$ do
10:    $O =$ Shuffle($V_{G_P}$)
11:    for each $v_j \in O$ do
12:      $\mathcal{W}_{v_j} = RandomWalk(G_P, v_j, t)$
13:      for each $v_j \in \mathcal{W}_{v_j}$ do
14:        for each $u_k \in \mathcal{W}_{v_j}[j - w : j + w]$ do
15:          $J_{G_P}(\Phi_{G_P}) = -\log \Pr(u_k \mid \Phi(v_j))$
16:          $J_G(\Phi_{G_P}) = -\log \Pr(P2N(v_j) \mid \Phi(v_j))$
17:          $\Phi_{G_P} = \Phi_{G_P} - \alpha * \left( \frac{\partial J_{G_P}}{\partial \Phi_{G_P}} + \lambda \frac{\partial J_G}{\partial \Phi_{G_P}} \right)$
18:  return $\Phi_{G_P}, P2N$

*FIG. 2*

| Dataset | Adjacency Methods Non-Embedding baselines | | | Embedding Methods Embedding Baselines | | | | | Ours |
|---|---|---|---|---|---|---|---|---|---|
| | Jaccard | Common Neighbors | Adamic Adar | d | Eigen Maps | node2vec | DNGR | Asymmetric | SPLITTER |
| directed | | | | | | | | | |
| soc-epinions | 0.649 | 0.649 | 0.647 | 8 | † | 0.735 | † | 0.695 | 0.972 |
| | | | | 16 | † | 0.726 | † | 0.699 | 0.974 |
| | | | | 32 | † | 0.714 | † | 0.700 | 0.973 |
| | | | | 64 | † | 0.699 | † | 0.698 | 0.970 |
| | | | | 128 | † | 0.691 | † | 0.718 | 0.967 |
| wiki-vote | 0.579 | 0.580 | 0.562 | 8 | 0.613 | 0.643 | 0.630 | 0.608 | 0.950 |
| | | | | 16 | 0.607 | 0.642 | 0.622 | 0.643 | 0.952 |
| | | | | 32 | 0.610 | 0.641 | 0.619 | 0.683 | 0.953 |
| | | | | 64 | 0.613 | 0.642 | 0.598 | 0.702 | 0.932 |
| | | | | 128 | 0.622 | 0.643 | 0.554 | 0.730 | 0.939 |
| undirected | | | | | | | | | |
| ca-HepTh | 0.765 | 0.765 | 0.765 | 8 | 0.786 | 0.731 | 0.706 | 0.605 | 0.877 |
| | | | | 16 | 0.790 | 0.787 | 0.780 | 0.885 | 0.897 |
| | | | | 32 | 0.795 | 0.858 | 0.829 | 0.884 | 0.909 |
| | | | | 64 | 0.802 | 0.886 | 0.868 | 0.870 | 0.917 |
| | | | | 128 | 0.812 | 0.901 | 0.897 | 0.820 | 0.920 |
| ca-AstroPh | 0.942 | 0.942 | 0.944 | 8 | 0.825 | 0.811 | 0.852 | 0.592 | 0.959 |
| | | | | 16 | 0.825 | 0.833 | 0.877 | 0.657 | 0.972 |
| | | | | 32 | 0.824 | 0.899 | 0.917 | 0.942 | 0.978 |
| | | | | 64 | 0.824 | 0.934 | 0.939 | 0.936 | 0.982 |
| | | | | 128 | 0.829 | 0.955 | 0.968 | 0.939 | 0.985 |
| PPI | 0.766 | 0.776 | 0.779 | 8 | 0.710 | 0.733 | 0.583 | 0.550 | 0.863 |
| | | | | 16 | 0.711 | 0.707 | 0.667 | 0.786 | 0.869 |
| | | | | 32 | 0.709 | 0.691 | 0.741 | 0.794 | 0.869 |
| | | | | 64 | 0.707 | 0.671 | 0.767 | 0.813 | 0.866 |
| | | | | 128 | 0.737 | 0.688 | 0.769 | 0.799 | 0.863 |

FIG. 3

| Dataset | Avg. Personas per Node $\bar{p}$ |
|---|---|
| soc-epinions | 3.03 |
| wiki-vote | 4.00 |
| ca-HepTh | 2.39 |
| ca-AstroPh | 2.53 |
| ppi | 4.97 |

FIG. 4

| Dataset | $d_{max} = 16\tilde{\rho}$ | Best EigenMaps | Best Node2Vec | Best DNGR | Best Asymmetric | SPLITTER $d = 16$ |
|---|---|---|---|---|---|---|
| soc-epinions | 48.5 | † | 0.726 | † | 0.700 | 0.974 |
| wiki-vote | 64.0 | 0.613 | 0.643 | 0.630 | 0.702 | 0.952 |
| ca-HepTh | 38.2 | 0.802 | 0.886 | 0.868 | 0.885 | 0.897 |
| ca-AstroPh | 40.5 | 0.824 | 0.934 | 0.939 | 0.942 | 0.972 |
| ppi | 79.5 | 0.737 | 0.733 | 0.769 | 0.813 | 0.869 |

FIG. 5

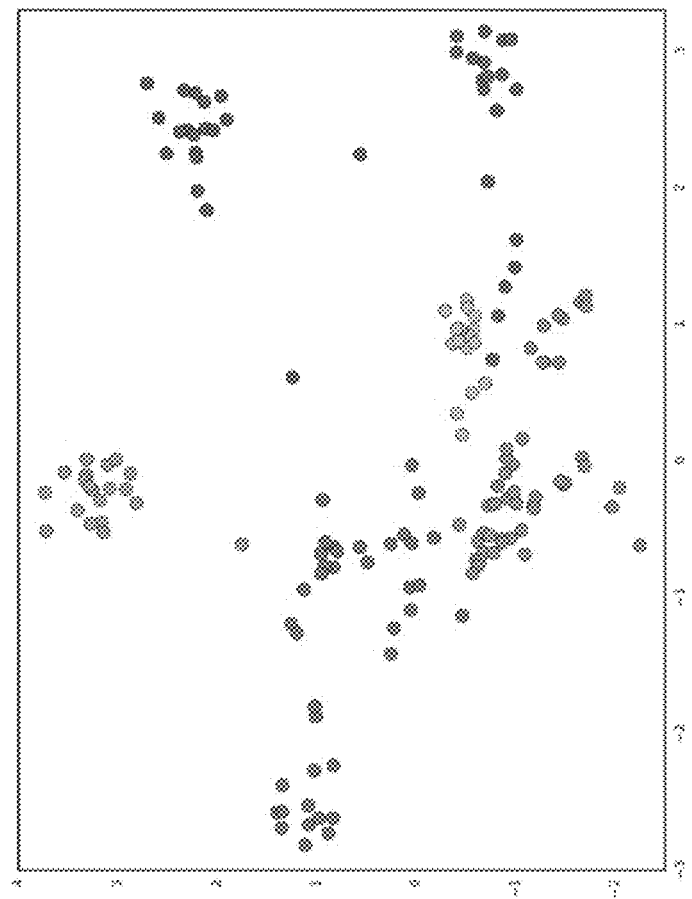
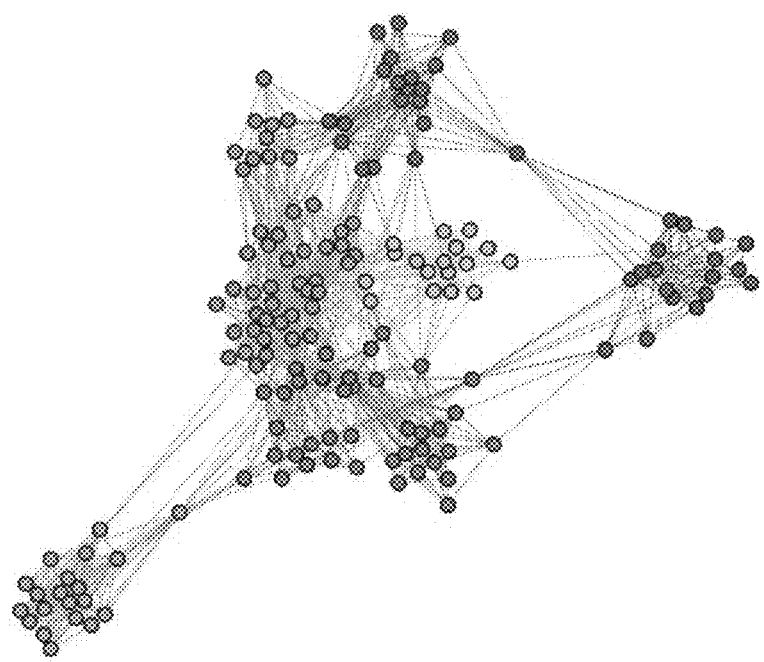
FIG. 7B
FIG. 7A

METHODS AND SYSTEMS FOR ENCODING GRAPHS

PRIORITY CLAIM

The present application is based on and claims benefit of U.S. Provisional Application 62/703,524 having a filing date of Jul. 26, 2018, which is incorporated by reference herein

FIELD

The present disclosure relates generally to graph theory and applications thereof. More particularly, the present disclosure relates to encoding graphs.

BACKGROUND

Graphs are mathematical structures used to model pairwise relations between entities. The entities can be represented by nodes of a graph, which can further include edges connecting the nodes and representing their relations. A graph can be encoded. For example, an embedding can be generated for a given graph by utilizing an algorithm that determines a vector representation that maps each node in the graph to a unique d dimensional vector. Conventionally, a single embedding vector is determined for each node in the graph.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more computing devices, data describing a first graph. The method can also include generating, by the computing device(s) and based at least in part on the data describing the first graph, data describing a second graph. The second graph can include, for each node, of one or more nodes, of the first graph, multiple nodes corresponding to the node of the first graph. Each node of the multiple nodes can represent an instantiation of the node of the first graph in a community to which the node of the multiple nodes belongs. The method can further include encoding, by the computing device(s), the first graph and/or the second graph. The encoding can include, for each node, of the node(s), of the first graph, determining, based at least in part on the data describing the second graph and for each node of the multiple nodes of the second graph corresponding to the node of the first graph, a representation of a role of the node of the multiple nodes in the community to which the node of the multiple nodes belongs. The method can further include identifying (e.g., predicting, and/or the like), by the computing device(s) and based at least in part on the encoding, a link between two different nodes of the first graph and/or the second graph.

Another example aspect of the present disclosure is directed to a system. The system can include one or more processors and a memory storing instructions that when executed by the processor(s) cause the system to perform operations. The operations can include receiving data describing a first graph. The operations can also include generating data describing a plurality of ego networks. The plurality of ego networks can include, for each node, of one or more nodes, of the first graph, one or more ego networks of the node of the first graph. The operations can further include partitioning the plurality of ego networks into a plurality of partitions. The operations can further include generating, based at least in part on the plurality of partitions, a second graph. The second graph can include, for each node, of the node(s), of the first graph, multiple nodes corresponding to the node of the first graph. Each node of the multiple nodes can represent an instantiation of the node of the first graph in a community to which the node of the multiple nodes belongs. The operations can further include, for each node, of the node(s), of the first graph, determining, based at least in part on the data describing the second graph, and for each node of the multiple nodes of the second graph corresponding to the node of the first graph, a representation of a role of the node of the multiple nodes in the community to which the node of the multiple nodes belongs.

A further example aspect of the present disclosure is directed to one or more non-transitory computer-readable media. The non-transitory computer-readable media can comprise instructions that when executed by one or more computing devices cause the computing device(s) to perform operations. The operations can include receiving data describing a first graph. The operations can also include, for each node, of one or more nodes, of the first graph, determining, based at least in part on data describing a second graph, and for each node of multiple nodes of the second graph corresponding to the node of the first graph, a representation of a role of the node of the multiple nodes in a community to which the node of the multiple nodes belongs.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawings executed in color. Copies of this patent application publication with color drawing(s) will be provided by the Office upon request and payment of necessary fee.

Detailed discussion of embodiments directed to one of ordinary skill in the art is set forth in the specification, which makes reference to the appended figures, in which:

FIG. 2 depicts an example algorithm according to example embodiments of the present disclosure;

FIG. 3 depicts example results for an example link-prediction task performed in accordance with example embodiments of the present disclosure;

FIG. 4 depicts example average numbers of persona nodes for example graphs generated in accordance with example embodiments of the present disclosure;

FIG. 5 depicts example results for an example task performed in accordance with example embodiments of the present disclosure;

FIG. 7A depicts an example persona graph for the particular example task performed in accordance with example embodiments of the present disclosure, and FIG. 7B depicts an example embedding of the example persona graph;

DETAILED DESCRIPTION

Figure 1:
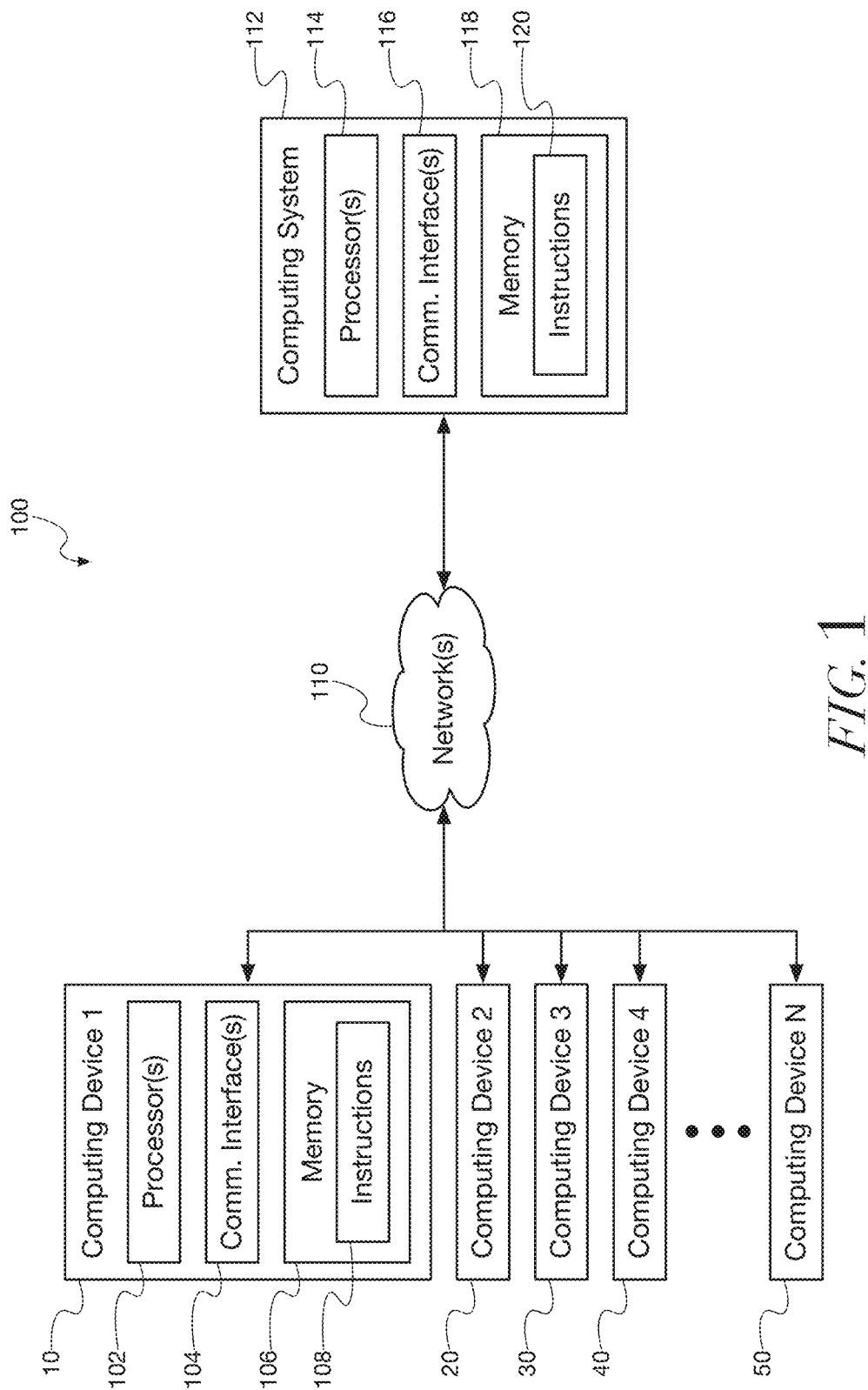
FIG. 1 depicts an example computing environment according to example embodiments of the present disclosure.

Example aspects of the present disclosure are directed to encoding graphs. In particular, a computing system (e.g., one or more computing devices, and/or the like) can receive data describing a first (e.g., initial, original, and/or the like) graph. The computing system can generate, based at least in part on the data describing the first graph, data describing a second (e.g., new, different, distinct, and/or the like) graph. The second graph can include, for each node, of one or more nodes, of the first graph (e.g., for each node of one or more portions, segments, and/or the like of the first graph), multiple nodes corresponding to the node of the first graph. Each node of such multiple nodes can represent an instantiation of the node of the first graph in a community to which the node of such multiple nodes belongs. For example, the second graph can be a persona graph of the first graph and can include, for each node, of one or more nodes, of the first graph, persona nodes representing different personas of the node of the first graph that belong to various different communities (e.g., the persona graph can indicate the node of the first graph is associated with such various different communities, and/or the like). In accordance with aspects of the disclosure, for each node, of the node(s), of the first graph, the computing system can (e.g., based at least in part on the data describing the second graph, and/or the like) determine, for each node of the multiple nodes of the second graph corresponding to the node of the first graph, a representation of a role of the node of the multiple nodes in the community to which the node of the multiple nodes belongs. For example, for each node, of the node(s), of the first graph, the computing system can determine, for each of the persona nodes representing the different personas of the node of the first graph, a representation of the role of the persona node in a community (e.g., of the various different communities with which the persona graph indicates the node of the first graph is associated, and/or the like) to which the persona node belongs.

In some embodiments, determining the representation of the role of the node of the multiple nodes in the community to which the node of the multiple nodes belongs can include determining a numerical embedding in an embedding dimensional space. Additionally or alternatively, a dot-product between a pair of representations respectively determined by the computing system for a pair of nodes of the second graph can encode a similarity between the pair of nodes in the second graph.

In some embodiments, generating the data describing the second graph can include generating data describing a plurality of ego networks comprising, for each node, of the node(s), of the first graph, one or more ego networks of the node of the first graph. The computing system can partition the plurality of ego networks into a plurality of partitions. In some of such embodiments, the data describing the second graph can be generated based at least in part on the plurality of partitions. In some embodiments, for each node, of the node(s), of the first graph, the computing system can determine, based at least in part on a number of the plurality of partitions comprising the node of the first graph, a number of the multiple nodes corresponding to the node of the first graph (e.g., the persona nodes, and/or the like) to include in the second graph (e.g., the persona graph, and/or the like).

In some embodiments, the computing system can (e.g., based at least in part on the data describing the first graph, and/or the like) determine, for each node, of the node(s), of the first graph, a representation of the node of the first graph in the first graph. In some of such embodiments, determining the representation of the role of the node of the multiple nodes in the community to which the node of the multiple nodes belongs can include determining, based at least in part on the representation of the node of the first graph in the first graph, the representation of the role of the node of the multiple nodes in the community to which the node of the multiple nodes belongs. In some embodiments, determining the representation of the role of the node of the multiple nodes in the community to which the node of the multiple nodes belongs can include determining, based at least in part on a parameter (e.g., a predetermined factor, constant, variable, and/or the like) that regularizes the degree to which the representation of the role of the node of the multiple nodes in the community to which the node of the multiple nodes belongs can deviate from the representation of the node of the first graph in the first graph, the representation of the role of the node of the multiple nodes in the community to which the node of the multiple nodes belongs.

In some embodiments, determining the representation of the role of the node of the multiple nodes in the community to which the node of the multiple nodes belongs can include determining the representation of the role of the node of the multiple nodes in the community to which the node of the multiple nodes belongs such that the representation of the role of the node of the multiple nodes in the community to which the node of the multiple nodes belongs predicts the node of the first graph. Additionally or alternatively, determining the representation of the role of the node of the multiple nodes in the community to which the node of the multiple nodes belongs can include determining the representation of the role of the node of the multiple nodes in the community to which the node of the multiple nodes belongs such that the representation of the role of the node of the multiple nodes in the community to which the node of the multiple nodes belongs comprises a dependency on the node of the first graph.

In some embodiments, determining the representation can include determining the representation based at least in part on an overlapping structure of the community to which the node of the multiple nodes belongs and one or more other communities.

In some embodiments, the first graph can be an undirected graph. In some of such embodiments, each node of the second graph can correspond to a node of the first graph, and each edge of the second graph can correspond to an edge of the first graph.

In some embodiments, the computing system can utilize the representations for one or more determinations, applications, and/or the like. For example, the computing system can predict, for a node, of the node(s), of the first graph, and based at least in part on representations, determined by the computing system for the multiple nodes of the second graph corresponding to the node of the first graph, of roles of the multiple nodes in communities to which the multiple nodes belong, a link between the node of the first graph and another node of the first graph. Additionally or alternatively, the computing system can generate, for a node, of the node(s), of the first graph, and based at least in part on representations, determined by the computing system for the multiple nodes of the second graph corresponding to the node of the first graph, of roles of the multiple nodes in communities to which the multiple nodes belong, a graphical user interface (GUI) depicting the communities to which the multiple nodes belong. In some embodiments, one or more nodes of the graph can correspond to biological, chemical, and/or the like entities, for example, one or more proteins, protein complexes, deoxyribonucleic acid (DNA) structures, large molecules, small molecules, other biological, chemical, or pharmaceutical structures, and/or the like. In some of such embodiments, the representations can be utilized for identifying, isolating, discovering, and/or the like such entities, relationships between such entities, and/or the like (e.g., gene discovery, drug discovery, biosimilar discovery, and/or the like).

The technology described herein can provide a number of technical effects and benefits. For example, as described herein, the technology described herein can improve the tasks of link discovery, generating GUIs that support visual discovery, exploration, and/or the like of community membership of nodes, and/or the like, thereby optimizing processing, decreasing utilization of resources (e.g., processing power, memory utilization, energy consumption, and/or the like), improving user experience, and/or the like. For example, as described herein, the instant technology can improve link discovery, thereby reducing processing iterations required to predict, discover, and/or the like certain relationships amongst various nodes, enabling prediction of one or more otherwise unidentifiable relationships amongst certain nodes, and/or the like. It will be appreciated, such improvements can conserve resources (e.g., by obviating the need for unnecessary processing cycles, supporting the use of more efficient data structures, and/or the like).

With reference now to the Figures, example embodiments of the present disclosure will be discussed in further detail.

FIG. 1 depicts an example computing environment according to example embodiments of the present disclosure.

Referring to FIG. 1, environment 100 can include one or more computing devices (e.g., one or more desktop computers, laptop computers, tablet computers, mobile devices, smartphones, servers, and/or the like). For example, environment 100 can include computing devices 10, 20, 30, 40, and 50 and computing system 112, which can include one or more computing devices. Environment 100 can also include one or more networks 110 (e.g., one or more wired networks, wireless networks, and/or the like). Network(s) 110 can interface computing devices 10, 20, 30, 40, and/or 50 with one another and/or with computing system 112.

Computing device 10 can include one or more processor(s) 102, one or more communication interfaces 104, and memory 106 (e.g., one or more hardware components for storing executable instructions, data, and/or the like). Communication interface(s) 104 can enable computing device 10 to communicate with computing devices 20, 30, 40, and/or 50 and/or with computing system 112. Memory 106 can include (e.g., store, and/or the like) instructions 108. When executed by processor(s) 102, instructions 108 can cause computing device 10 to perform one or more operations, functions, and/or the like described herein. It will be appreciated that computing devices 20, 30, 40, and/or 50 can include one or more of the components described above with respect to computing device 10.

Computing system 112 can include one or more processor(s) 114, one or more communication interfaces 116, and memory 118 (e.g., one or more hardware components for storing executable instructions, data, and/or the like). Communication interface(s) 116 can enable computing system 112 to communicate with computing devices 10, 20, 30, 40, and/or 50. Memory 118 can include (e.g., store, and/or the like) instructions 120. When executed by processor(s) 114, instructions 120 can cause computing system 112 to perform one or more operations, functions, and/or the like described herein.

Unless explicitly indicated otherwise, the operations, functions, and/or the like described herein can be performed by computing devices 10, 20, 30, 40, and/or 50 and/or computing system 112 (e.g., by computing device 10, 20, 30, 40, or 50, by computing system 112, by a combination of computing devices 10, 20, 30, 40, and/or 50 and/or computing system 112, and/or the like).

Recent interest in graph embedding methods has focused on learning a single representation for each node in the graph. Methods and systems for learning multiple representations of the nodes in a graph (e.g. the users of a social network, and/or the like) are described herein. Based on a principled decomposition of an ego-network, and/or the like, each representation can encode the role of the node in a different local community to which the nodes participate, and/or the like. Such representations can allow for improved reconstruction of the nuanced relationships which can occur in the graph—a phenomenon which will be illustrated herein through state-of-the-art results on link prediction tasks on a variety of graphs, reducing the error by up to 90%. Moreover, as described herein, such embeddings can allow for effective visual analysis of the learned community structure, and/or the like.

Learning embedded representations of graphs is a recent and very active area. In a nutshell, an embedding algorithm can learn a latent vector representation that maps each vertex v in a graph G to a unique d dimensional vector. This area has found strong applications, as the embedding representation of nodes can lead to improved results in data mining, as well as machine-learning tasks, such as node classification, user profiling, ranking, link prediction, and/or the like. Conventionally, an assumption of embedding methods is that a single embedding vector is learned for each node in the graph. The embedding method can then be said to seek to identify the unique role, position, and/or the like of each node in the geometry of the graph.

A parallel can be drawn between the recent research of graph embedding and the more established field of community detection, graph clustering, and/or the like. Detecting clusters in real world networks is a central topic in computer science, with extensive literature devoted thereto. At the beginning of its development, graph clustering focused mostly on the study of non-overlapping clustering methods. In such methods, each node can be assigned to a unique cluster or community. While the problem of non-overlapping clustering is better understood and has found strong applications and theoretical results, recently much attention has been devoted to developing overlapping clustering methods where each node can be allowed to participate in multiple communities.

Recent development of overlapping clustering is underpinned by several observations on the topology of real-world networks and of their clustering structures (or lack thereof). Several modeling efforts of community structures of social networks and empirical studies of their macroscopic and microscopic structures have observed a lack of a clear macroscopic non-overlapping community structure in real-world networks. For example, empirical evidence indicates it is rare to observe communities with clear clustering, and it has been observed that real-world communities are frequently not detected by commonly used non-overlapping clustering methods. This can be explained by the fact that real-world communities commonly overlap strongly, as nodes often belong to multiple communities.

As described herein, results indicate embedding methods can benefit from awareness of the overlapping clustering structure of real graphs. In particular, methods and systems are described herein in which nodes can be embedded in multiple vectors representing their participation in different communities. For example, an unsupervised embedding method described herein can allow nodes in a graph to have multiple embeddings that can better encode the participation of the nodes in multiple overlapping communities. The method can be based on ego-net analysis, in particular on an overlapping clustering algorithm based on ego-network partitioning.

As described herein, the observation that cluster structure can be easier to identify at the local node-centric level of ego-nets (or ego-networks), which can be defined as the subgraph induced over the neighborhood of a single node in the graph, can be exploited. Intuitively, this can occur because even if a node is part of many communities, if attention is restricted to a node neighborhood, each node can interact with a given neighbor in a single context. It is possible to detect high-quality communities in one or more ego-nets using partitioning algorithms, and overlapping clustering methods can be based thereon.

In some embodiments, a persona-graph concept can be exploited. For example, given a graph G, a new graph $G_P$ (e.g., a persona graph of G, and/or the like) can be created, where each node u in G can be represented by a series of replicas (e.g., personas of u, and/or the like) in $G_P$, where each persona node can represent an instantiation of the node u in a local community to which it belongs. As described herein, such ego-net-based techniques can lead to improvements in embedding methods. In particular, a natural embedding method based on the persona graph can outperform many embedding baselines in the task of link prediction.

Described herein are: a novel graph-embedding method that can embed each node in a graph into multiple embedding vectors based on analysis of overlapping structure of communities in real networks; a novel graph-regularization constraint to the optimization that can enforce consistency of the multiple learned representations for each node; a process for automatically determining the number of embeddings to use for each node depending on a principled analysis of the local neighborhood of the node, which can, for example, obviate the need to specify the number of embeddings as a parameter; experimentally strong improvements with respect to several embedding baselines for the task of link prediction; and utilization of the methods and systems described herein for visual discovery of community membership for nodes which are part of multiple communities (e.g., social groups, and/or the like).

Regarding persona-graph decomposition, given an undirected graph G=(V, E) consisting of a set V of nodes and set E⊂V×V of edges, let a non-overlapping clustering algorithm $\mathcal{A}$ be an algorithm that given an input graph G=(V, E) can output a partition $\mathcal{A}$(G)=($V_1, \ldots, V_t$) of the vertices V into t disjoint sets. In some embodiments, for t≥1, t can be determined by the algorithm and thus may not be required as an input. The notation $np_{\mathcal{A}}$(G)=t can denote the number of sets in the partition. $\mathcal{A}$ can be, for example, any non-overlapping clustering algorithm.

Given a graph G=(V, E) and a subset of nodes U⊂V, the induced graph G[U]=(U, E∩U×U) can be defined. For a node u∈V, the neighborhood of u can consist of the set of nodes connected to it $N_u$={v; (u, v)∈E}, and the ego-net of u can consist of the graph induced on the neighborhood G[$N_u$]. For example, in some embodiments, the ego-net of u may not include the node u itself.

Given graph G=(V, E) and a clustering algorithm $\mathcal{A}$, the persona graph $G_P$=($V_P$, $E_P$) can be obtained from G (e.g., with the use of the algorithm $\mathcal{A}$, and/or the like), for example, by utilizing the following three step process: (1) For each node u∈V, the clustering algorithm $\mathcal{A}$ can be utilized to partition the ego-net of u, for example, let $\mathcal{A}$(G[$N_u$])={$N_u^1, N_u^2, \ldots, N_u^{t_u}$} where $t_u = np_{\mathcal{A}}$(G[$N_u$]); (2) a set V' of personas can be created, for example, each node $v_o$ in V can correspond to $t_{v_o}$ personas (e.g., the number of splits of the ego-net of $v_o$, and/or the like) in $V_P$ denoted by $v_i$ for i=1, ..., $t_{v_o}$; and (3) edges can be added between personas, for example, if (u, v)∈E, v∈$N_u^i$, and u∈$N_v^j$ then an edge ($u_i$, $v_j$) can be added to $E_P$.

Essentially the persona graph $G_P$ of G can be a new graph where each node in G is split into multiple persona nodes. There can be a direct mapping between each persona node in $G_P$ and an original node in graph G. Moreover, each edge of the persona graph $G_P$ can be mapped to a unique edge of the original graph G. In some embodiments, this can mean the persona graph uses approximately the same space as the original graph. It has been shown that such persona graphs can be constructed efficiently.

Regrading, network representation learning, the goal of network representation learning can be to infer a mapping Φ: v∈V ↦ $\mathbb{R}^{|V|\times d}$. This mapping Φ can encode the latent social representation associated with each vertex v in the graph. In some embodiments, Φ can be stored as a |V|×d matrix of free parameters, and/or the like.

For example, a vertex can be modeled as a function of its node by exploiting the co-occurrences of pairs of nodes in short truncated random walks. The sequences generated by such random walks can capture the diffusion around each vertex in the graph and can encode its local community structure. The goal of the method can be to estimate the likelihood of a vertex $v_i$ co-occurring with its local neighborhood:

$$Pr(v_i | (\Phi(v_1), \Phi(v_2), \ldots, \Phi(v_{i-1}))) \qquad [1].$$

As the walk length grows, computing exactly this conditional probability can become infeasible. Accordingly, the problem can be relaxed by ignoring the order of neighboring vertices, and instead of using the context to predict a missing vertex, using one vertex to predict its local structure. For the vertex representation modeling, this can imply the following optimization problem:

$$\underset{\Phi}{\text{minimize}} -\log Pr(\{v_{i-w}, \ldots, v_{i+w}\} \setminus v_i | \Phi(v_i)). \qquad [2]$$

In some embodiments, the probability of a node $v_i$ co-occurring with $v_j$ can be modeled by using a softmax to map the pairwise similarity to a probability space:

$$Pr(v_i | v_j) = \frac{\exp(\Phi(v_i) \cdot \Phi'(v_j))}{\sum_{j \in v} \exp(\Phi(v_i) \cdot \Phi'(v_j))}, \quad [3]$$

wherein $\Phi'(v_i)$ and $\Phi'(v_j)$ can represent the "input" and "output" embeddings for nodes $v_i$ and $v_j$, respectively.

As previously indicated, network representation learning can seek to learn a function that maps each node to its own representation. One or more modifications that can be made in light of a desire to learn one or more representations for each node will now be discussed in greater detail.

Using the persona decomposition previously described, the input graph G can be converted into the persona graph G. It may thus seem straightforward to learn one representation for each node $v \in |V_p|$, and thereby learn one or more representations for each original node $u \in |V|$. Often, however, this may not be the case. The strength of the persona decomposition can also be a weakness: it can create a graph that is quite different from that of the original input. In fact, the persona graph can be so different that it may consist of many disconnected components, even if the original graph was connected. These disconnected components can cause difficulties for representation-learning methods. To address these challenges, one or more improvements can be made to the learning algorithm.

For example, in some embodiments, a constraint that the persona representations be able to predict their original node in addition to predicting the personas around it in $G_P$ can be added. Specifically, given a persona $v_i$, its representation can be determined such that it includes a dependency on the node $v_0$ in the original graph G:

$$Pr(v_o | \Phi_{G_P}(v_i)) \quad [4].$$

To control the strength of graph regularization, the parameter $\lambda$ can be introduced and combined with [2] to yield the following optimization problem:

$$\underset{\Phi_{G_P}}{\text{minimize}} - \log Pr(\{v_{i-w}, \ldots, v_{i+w}\} \backslash v_i | \Phi_{G_P}(v_i)) \quad [5]$$

$$-\lambda \log Pr(v_o | \Phi_{G_P}(v_i)) \ldots$$

For example, this change to the optimization can enforce that there are invisible edges to each persona's parent that inform the learning process, thereby regularizing the degree to which the persona representations can deviate. In practice, good results were achieved by setting $\lambda=0.1$.

Additionally or alternatively, the representation $\Phi_{G_P}(v)$ of a node v's personas can be determined based at least in part on (e.g., made to depend on, and/or the like) its original representation $\Phi_G(v)$ as a prior. Such representation of the original graph $\Phi_G$ can serve as a good initialization, thereby avoiding potential bad initializations.

As indicated, the method can output multiple embeddings for each node. In some embodiments, machine-learning (ML) methods can be utilized to learn a function of the multiple embeddings of each node, pair of nodes, and/or the like. Additionally or alternatively, the maximum dot product over all pairs of embeddings of u and v can be utilized to predict the likelihood of the pair of nodes of being connected.

In addition to an undirected graph G (V, E), and the dimensionality of the representations d, the algorithm can take a number of input parameters that can control the embedding learning process. The first group of parameters can deal with sampling G. Briefly, the parameters to control the sampling process can include: w, the window size to slide over the random walk; t, the length of the random walk to sample from each vertex; and γ the number of walks per vertex. It will be appreciated that the approach is not limited to simple, uniform random-walk sampling. For example, other graph-sampling strategies can be applied in the model.

Another group of parameters can control the optimization. For example, the parameter α can control the learning rate for stochastic gradient descent, and the parameter λ can affect how strongly the original graph representation regularizes the persona learning.

In some embodiments, an embedding function EmbedFn, can be used to learn a representation $\Phi_G$ of the nodes in the original graph. In order to use the learning algorithm, this embedding method may simply need to produce representations where the dot-product between vectors encodes the similarity between nodes. Many popular graph embedding methods (e.g., DeepWalk, LINE, node2vec, and/or the like) meet this criteria.

FIG. 2 depicts an example algorithm according to example embodiments of the present disclosure. Referring to FIG. 2, lines 2-4 can initialize the data structures, create the persona graph, and learn the embedding of the underlying graph. In some embodiments, not all nodes will necessarily be split; this can depend on each ego-net's structure, as previously described. Lines 5-8 can use the persona graph to initialize the persona representations $\Phi_{G_P}$. The remainder of the algorithm (lines 9-17) detail how the persona representations can be learned. Line 12 can generate the random walks to sample the context of each vertex. Without loss of generality, these can be graph samples generated in any meaningful way, for example, including uniform random walks, skipped random walks, random walks with backtrack, and/or the like. Line 15 can calculate the loss due to nodes in the persona graph (e.g., how well the persona representation of $\Phi_{v_j}$ is able to predict the observed node $u_k$, and/or the like). Line 16 can compute the loss due to the graph regularization (e.g., how well the persona representation $\Phi_{v_j}$ is able to predict its corresponding original node, and/or the like). Finally, line 18 can return the induced representations $\Phi_G$, and their mapping back to the original nodes P2N.

Regarding optimization, using representations to predict the probability of nodes (e.g., lines 15-16, and/or the like) can be computationally expensive. To deal with this, in some embodiments, the hierarchical softmax can be utilized to calculate these probabilities more efficiently. Additionally or alternatively, one or more other optimization strategies (e.g., noise contrastive estimation, and/or the like) can be utilized.

The model parameter set can include both $\Phi_G$, and T, the parameters used internally by the tree in hierarchical softmax. The back-propagation algorithm can be utilized to estimate the derivatives (e.g., in lines 15-16, and/or the like), and stochastic gradient descent (SGD) can be utilized to optimize the model's parameters. For example, the initial learning rate a for SGD can be set to 0.025 at the beginning of the training and then decreased linearly. The parameter λ can regularize the persona embeddings by how much they deviate from the node's original representation.

FIG. 3 depicts example results for an example link-prediction task performed in accordance with example embodiments of the present disclosure. Referring to FIG. 3, the methods and systems described herein, as well as other baselines, were tested on a dataset of five directed and undirected graphs. For each dataset, in accordance with the standard methodology, the largest weakly connected component of the original graph was used.

The statistics for the datasets are: for directed graphs, (i) soc-epinions: a social network, |V|=75,877 and |E|=508,836, wherein edges represent who trusts whom in the opinion-trust dataset of Epinions; and (ii) wiki-vote: a voting network, |V|=7,066 and |E|=103,663, wherein nodes are Wikipedia editors and each directed edge represents a vote for allowing another user to become an administrator; and for undirected graphs, (i) ca-HepTh: Arxiv's co-author network of High Energy Physics Theory, |V|=9,877 and |E|=25,998, wherein each edge represents co-authorship between two author nodes; (ii) ca-AstroPh: Arxiv's co-author network of Astrophysics, |V|=17,903 and |E|=197,031, wherein each edge represents co-authorship between two author nodes; and (iii) PPI: Protein-protein interaction graph, |V|=3,852 and |E|=20,881, a natural dataset, wherein each node is a protein and there is an edge between two proteins if they interact.

Regarding the link-prediction task, the input graph is split into two edge sets, $E_{train}$ and $E_{test}$ of equal size. The test edges are removed uniformly at random, with the restriction that they do not disconnect the graph. $E_{test}$ is then used as positive examples for a classification task. A corresponding equal-sized set of non-existent (random) edges are generated to use as negative examples for testing. The baseline methods are provided the training edges as input, which they use to learn a similarity model (embedded or otherwise). The performance of each method is then measured at ranking the removed edges. Specifically, for each method, the receiver operating characteristic (ROC)—the area under the receiver operating characteristic curve (AUC) is reported.

Several baseline methods were utilized, including non-embedding baselines (such as common neighbors) and several embedding baselines.

Regarding the non-embedding baselines, standard methods for link prediction that are solely based on the analysis of the adjacency matrix of the graph and in particular on the immediate neighborhood of the nodes in the graph are reported. These methods take in input $E_{train}$ during inference. N(u) denotes the neighbors of u observed in $E_{train}$. For directed graphs, N(u) only refers to the outgoing edges. In the non-embedding baselines considered, an edge (u, v) is scored as g(u, v), which is a function of N(u) and N(v) only. The following baselines were considered:

(i) Jaccard Coefficient:

$$g(u, v) = \frac{|N(u) \cap N(v)|}{|N(u) \cup N(v)|}$$

(ii) Common Neighbors:

$$g(u,v)=|N(u) \cap N(v)|$$

(iii) Adamic Adar:

$$g(u, v) = \sum_{x \in N(u) \cap N(v)} \frac{1}{\log(|N(x)|)}$$

Regarding the embedding baselines, these methods take as input $E_{train}$ to learn embedding $\Phi_G(u)$ for every graph node u. During inference, only the learned embeddings are used, not the original graph. The following state-of-the-art embedding methods were considered:

(i) Laplacian EigenMaps determines the lowest eigenvectors of the graph Laplacian matrix.

(ii) node2vec learns the embedding by performing random walks on the training edges $E_{train}$ and learning a minimizing skipgram objective.

(iii) DNGR performs non-linear (i.e., deep) node embedding, passing a "smoothed" adjacency matrix through a deep auto-encoder. The "smoothing" (called Random Surfing) is an alternative to random walks, which effectively has a different context weighting from node2vec.

(iv) Asymmetric is a recent method that learns embeddings by explicitly modeling the edges that appear in the graph. The comparison is against the most similar model proposed in the work, the shallow asymmetric model.

For each experiment, the AUC-ROC in the link prediction task performed using the ablation test previously described is reported.

The results of utilizing the methods and systems described herein (labeled SPLITTER in the table) are reported with several dimensionality settings. The results involve utilizing the connected-component method for ego-net clustering. For learning embeddings, the following settings were used: random walk length t=40, number of walks per node γ=10, the window size w=5. The initial learning rate α=0.025 and the graph regularization coefficient λ=0.1 were used. For EmbedFn, node2vec with random walk parameters (p=q=1) was used.

To gain an understanding of the embeddings, different sizes of the embeddings (per persona node) are compared with same size embeddings of other methods (per node). Since each node can have multiple persona embeddings, the total embedding size (for the same dimension) can be larger than that of another standard embedding method. For this reason, the results at the same total embedding size will subsequently be compared. As illustrated, at the same level of dimensionality, the methods and systems described herein always outperform all the other baselines. The improvement is particularly significant in the largest graph, epinions, where the method using size 8 embeddings improves AUC-ROC by a factor of 40% (reduction in error of 90%) even when compared with the best baseline with 128 dimensions. Similarly, the method achieves close to optimal performances in two other large graphs, wiki-vote and ca-AstroPh.

As previously indicated, the method embeds each node into multiple embeddings (one for each persona node), so for a given dimension d of the embedding, the average embedding size per node is given by d$\bar{p}$, where $\bar{p}$ is the average number of personas per nodes (e.g., the average number of ego-net clusters per node, and/or the like) in the graph.

FIG. 4 depicts example average numbers of persona nodes for example graphs generated in accordance with example embodiments of the present disclosure. Referring to FIG. 4, as indicated, the average number of persona nodes is between 2 and 5 (using the connected component ego-network splitting algorithm).

FIG. 5 depicts example results for an example task performed in accordance with example embodiments of the present disclosure. Referring to FIG. 5, the AUC-ROC of the methods and systems described herein is compared to other embeddings allowing the same (or higher) total embedding space. In the described example, d=16, the effective average embedding size for each dataset ($\bar{p}$16) is computed, and the results are compared with the best result for the other baseline that uses ≤16barp dimensions. As indicated, the AUC-ROC is higher than that of the other baselines using up to about p̄516 dimensions. This confirms that the method improves over the baselines even after accounting for the increased space due to the presence of multiple embeddings for nodes.

Figure 6A:
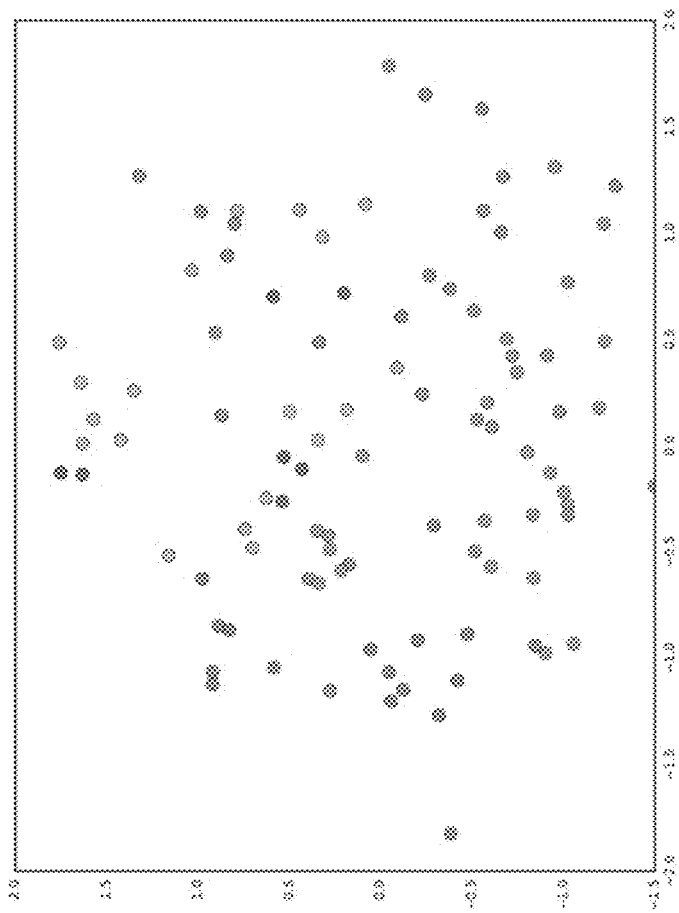
FIG. 6A depicts an example original graph for a particular example task performed in accordance with example embodiments of the present disclosure.
Figure 6B:
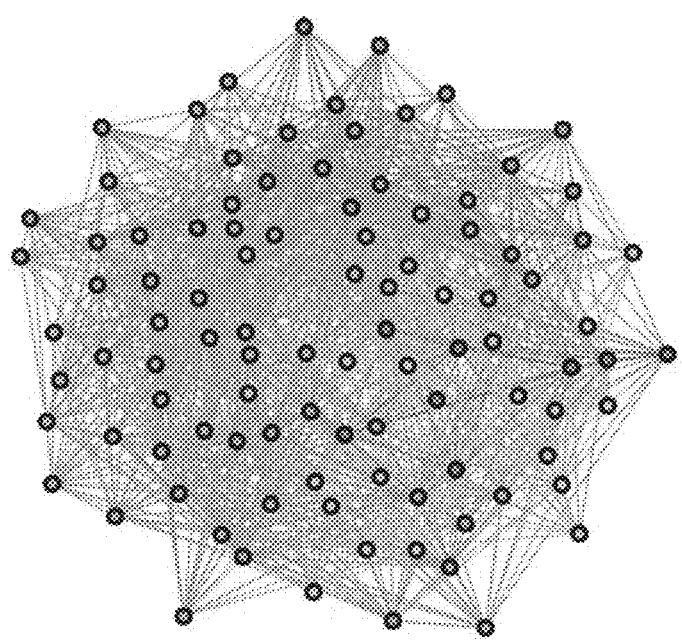
FIG. 6B depicts an example embedding of the example original graph.

FIG. 6A depicts an example original graph for a particular example task performed in accordance with example embodiments of the present disclosure, and FIG. 6B depicts an example embedding of the example original graph.

FIG. 7A depicts an example persona graph for the particular example task performed in accordance with example embodiments of the present disclosure, and FIG. 7B depicts an example embedding of the example persona graph.

To gain insight into how the embedding-method framework operates, a visualization of a small synthetic graph is provided. A random graph was created with planted overlapping communities using a model that replicates several properties of real-world graphs, such as power-law distribution of degrees, varying community sizes, and membership of nodes in varying community numbers. The graph contains 100 nodes and has nine highly overlapping ground-truth communities.

FIG. 6A depicts the original graph, and FIG. 7A depicts the corresponding persona graph obtained (as an intermediate output). The colors represent the communities identified on both graphs based on a standard non-overlapping modularity-based algorithm. As illustrated, the persona graph has a much clearer community structure (this can be seen by the eight communities on the persona graph (with respect to the five found in the original graph) that are also visibly more separated.

FIG. 6B depicts a 2D embedding obtained using node2vec with p=q=1 on the original graph, while FIG. 7B depicts a 2D embedding obtained using the methods and systems described herein. It will be appreciated how the embedding obtained using the methods and systems described herein more clearly identifies the community structure as the eight communities are appreciably separated. In contrast, the node2vec embeddings do not show clear separation.

Figure 8A:
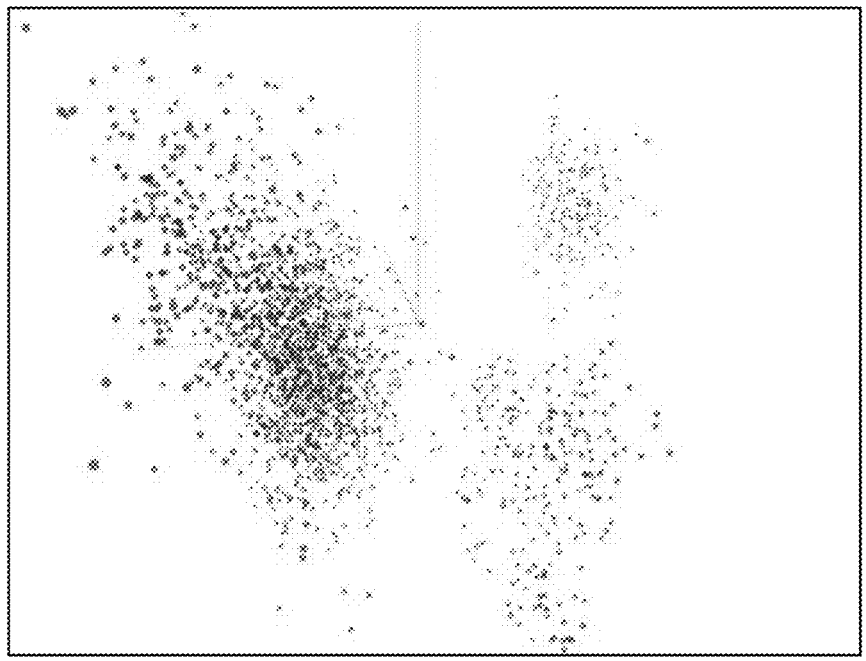
FIG. 8A depicts an example visualization of an example reference embedding for an example task.
Figure 8B:
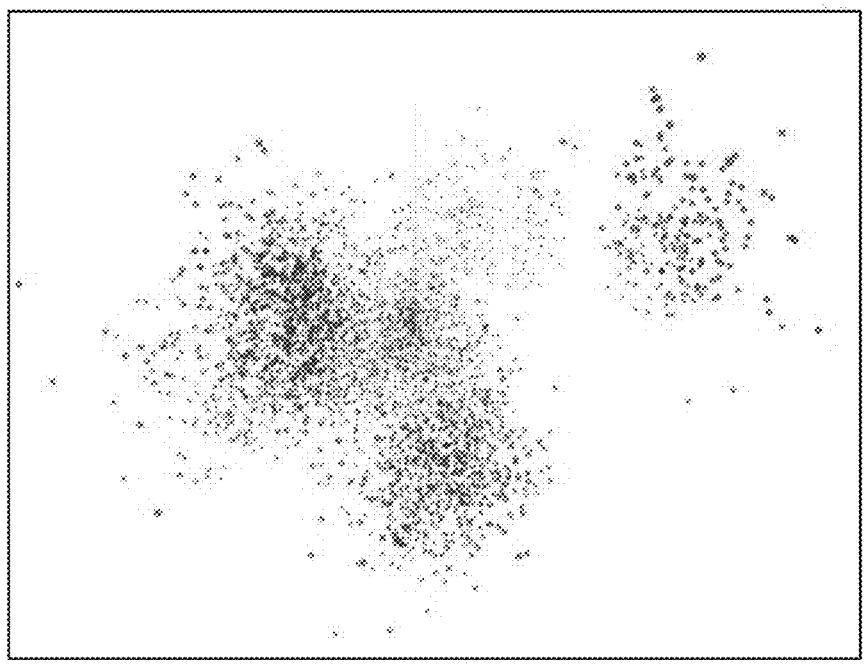
FIG. 8B depicts an example visualization of an example embedding for the same example task generated in accordance with example embodiments of the present disclosure.

FIG. 8A depicts an example visualization of an example reference embedding for an example task, and FIG. 8B depicts an example visualization of an example embedding for the same example task generated in accordance with example embodiments of the present disclosure. A real-world co-authorship graph was generated using DBLP data. The 4area graph contains co-authorship relationships extracted from papers in four areas of study: data mining, machine learning, databases, and information retrieval. FIG. 8A depicts a 3D plot of node2vec embeddings of the graph, while FIG. 8B depicts embeddings of the graph determined using the methods and systems described herein. Referring to FIG. 8B, as illustrated, there are four areas more or less separated that to inspection correspond to the four different fields. A similar observation is possible for FIG. 8A, representing the node2vec embeddings. A key observation in this application scenario is that many authors (in particular the most prolific ones) can contribute to more than one area of study or more than one subarea. Standard embedding methods, however, can force each node to be embedded in only one point in the space, while the methods and systems described herein can allow representation of a node as a combination of embeddings (in this setting, 1.58 personas per node were obtained on average).

Figure 9A:
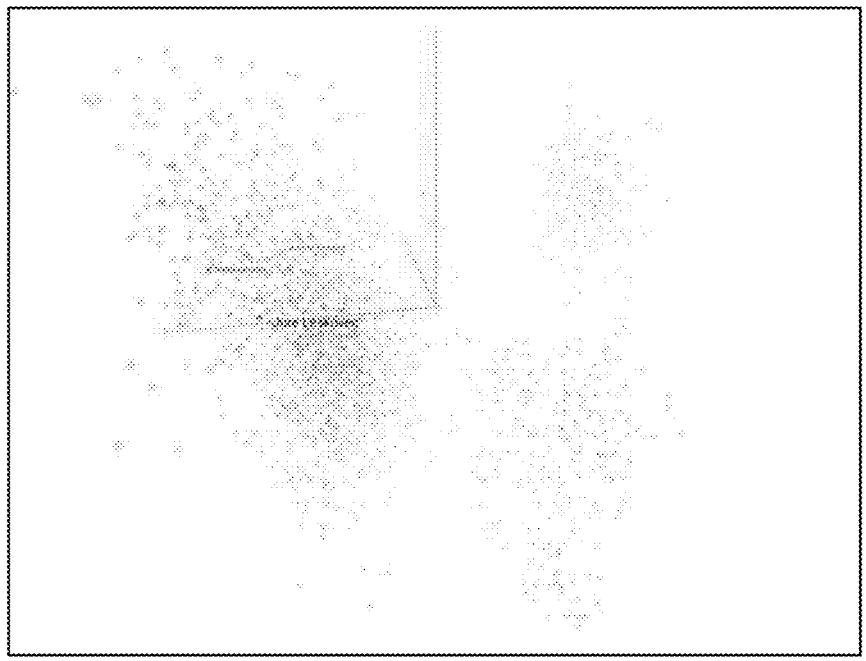
FIG. 9A depicts an example visualization of an example reference embedding for an example task.
Figure 9B:
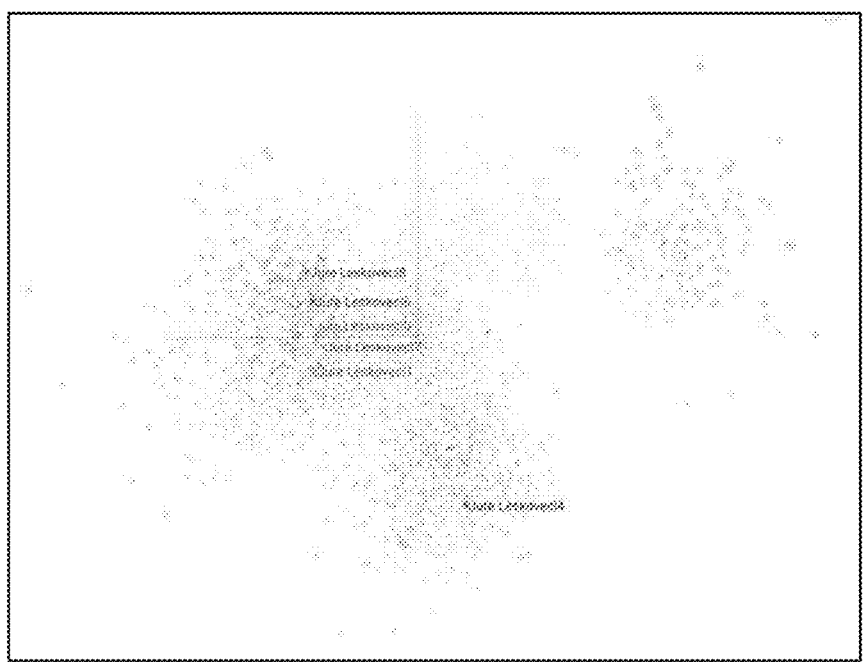
FIG. 9B depicts an example visualization of an example embedding for the same example task generated in accordance with example embodiments of the present disclosure.

FIG. 9A depicts an example visualization of an example reference embedding for an example task, and FIG. 9B depicts an example visualization of an example embedding for the same example task generated in accordance with example embodiments of the present disclosure. FIG. 9A depicts for one such prolific author the unique embedding obtained by node2vec, while FIG. 9B depicts the multiple embeddings determined using the methods and systems described herein. Referring to FIG. 9A, the node for the author is embedded in a data-mining region by node2vec, while FIG. 9B illustrates that the methods and systems described herein allow the node to span both the data-mining region and the machine-learning region of the space, better characterizing the contributions of the author.

Figure 10:
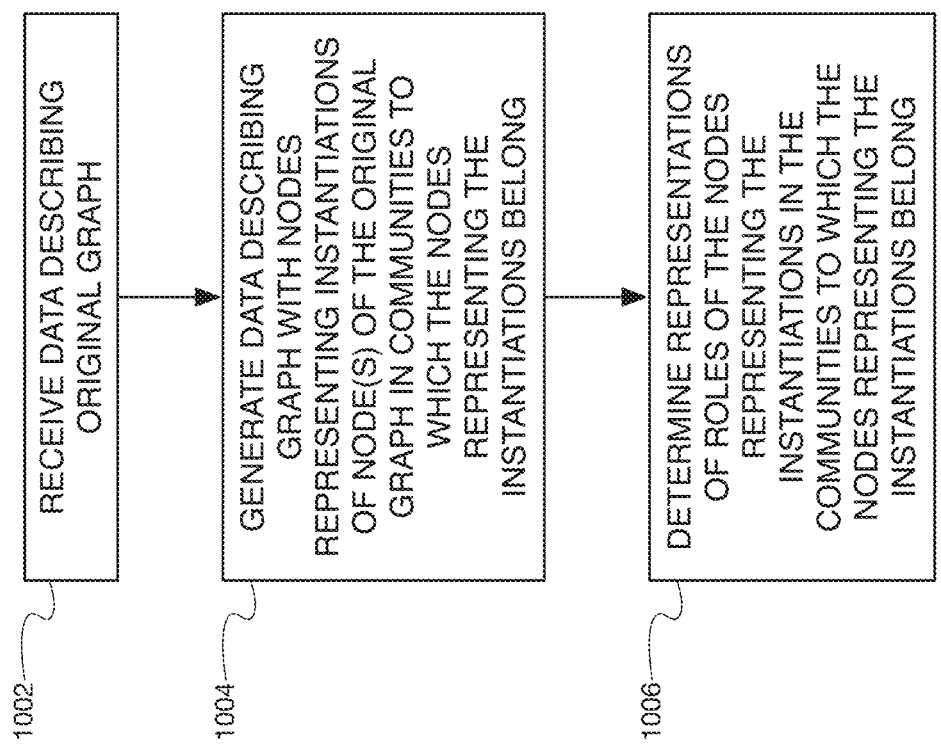
FIG. 10 depicts an example method according to example embodiments of the present disclosure.

FIG. 10 depicts an example method according to example embodiments of the present disclosure.

At (1002), data describing a first (e.g., initial, original, and/or the like) graph can be received. For example, computing system 112 can receive (e.g., from itself, one or more of computing devices 10, 20, 30, 40, and/or 50, and/or the like) data describing the original graph depicted by FIG. 6A, and/or the like.

At (1004), data describing a second (e.g., new, different, distinct, and/or the like) graph can be generated (e.g., based at least in part on the data describing the first graph, and/or the like). The second graph can include, for each node, of one or more nodes, of the first graph (e.g., for each node of one or more portions, segments, and/or the like of the first graph), multiple nodes corresponding to the node of the first graph. Each node of such multiple nodes can represent an instantiation of the node of the first graph in a community to which the node of such multiple nodes belongs. For example, computing system 112 can generate (e.g., based at least in part on the data describing the original graph depicted by FIG. 6A, and/or the like) data describing the persona graph depicted by FIG. 7A, and/or the like.

At (1006), for each node, of the node(s), of the first graph, a representation can be determined (e.g., based at least in part on the data describing the second graph, and/or the like), for each node of the multiple nodes of the second graph corresponding to the node of the first graph. The representation can represent a role of the node of the multiple nodes in the community to which the node of the multiple nodes belongs. For example, computing system 112 can determine (e.g., based at least in part on the data describing the persona graph depicted by FIG. 7A, and/or the like) each of the representations included in the embedding of the persona graph depicted by FIG. 7B, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
   receiving, by one or more computing devices, data describing a first graph;
   generating, by the one or more computing devices and based at least in part on the data describing the first graph, data describing a second graph, the second graph comprising, for each node, of one or more nodes, of the first graph, multiple nodes corresponding to the node of the first graph, each node of the multiple nodes representing an instantiation of the node of the first graph in a community to which the node of the multiple nodes belongs, wherein generating the data describing the second graph comprises:
      generating data describing a plurality of ego networks comprising, for each node, of the one or more nodes, of the first graph, one or more ego networks of the node of the first graph;
      partitioning the plurality of ego networks into a plurality of partitions; and
      generating the data describing the second graph based at least in part on the plurality of partitions;
   encoding, by the one or more computing devices, one or more of the first graph or the second graph, the encoding comprising, for each node, of the one or more nodes, of the first graph, determining, based at least in part on the data describing the second graph and for each node of the multiple nodes of the second graph corresponding to the node of the first graph, a representation of a role of the node of the multiple nodes in the community to which the node of the multiple nodes belongs; and
   identifying, by the one or more computing devices and based at least in part on the encoding, a link between two different nodes of one or more of the first graph or the second graph.

2. The computer-implemented method of claim 1, wherein determining the representation comprises determining the representation based at least in part on an overlapping structure of the community to which the node of the multiple nodes belongs and one or more other communities.

3. The computer-implemented method of claim 1, wherein generating the data describing the second graph comprises, for each node, of the one or more nodes, of the first graph, determining, based at least in part on a number of the plurality of partitions comprising the node of the first graph, a number of the multiple nodes corresponding to the node of the first graph to include in the second graph.

4. The computer-implemented method of claim 1, wherein generating the data describing the second graph comprises generating data describing a persona graph of the first graph.

5. The computer-implemented method of claim 1, wherein:
   the first graph comprises an undirected graph;
   each node of the second graph corresponds to a node of the first graph; and
   each edge of the second graph corresponds to an edge of the first graph.

6. The computer-implemented method of claim 1, wherein:
   the method comprises determining, by the one or more computing devices, for each node, of the one or more nodes, of the first graph, and based at least in part on the data describing the first graph, a representation of the node of the first graph in the first graph; and
   determining the representation of the role of the node of the multiple nodes in the community to which the node of the multiple nodes belongs comprises determining, based at least in part on the representation of the node of the first graph in the first graph, the representation of the role of the node of the multiple nodes in the community to which the node of the multiple nodes belongs.

7. The computer-implemented method of claim 6, wherein determining the representation of the role of the node of the multiple nodes in the community to which the node of the multiple nodes belongs comprises determining, based at least in part on a parameter that regularizes the degree to which the representation of the role of the node of the multiple nodes in the community to which the node of the multiple nodes belongs can deviate from the representation of the node of the first graph in the first graph, the representation of the role of the node of the multiple nodes in the community to which the node of the multiple nodes belongs.

8. The computer-implemented method of claim 1, wherein determining the representation of the role of the node of the multiple nodes in the community to which the node of the multiple nodes belongs comprises determining the representation of the role of the node of the multiple nodes in the community to which the node of the multiple nodes belongs such that the representation of the role of the node of the multiple nodes in the community to which the node of the multiple nodes belongs predicts the node of the first graph.

9. The computer-implemented method of claim 1, wherein determining the representation of the role of the node of the multiple nodes in the community to which the node of the multiple nodes belongs comprises determining the representation of the role of the node of the multiple nodes in the community to which the node of the multiple nodes belongs such that the representation of the role of the node of the multiple nodes in the community to which the node of the multiple nodes belongs comprises a dependency on the node of the first graph.

10. The computer-implemented method of claim 1, comprising predicting, by the one or more computing devices, for a node, of the one or more nodes, of the first graph, and based at least in part on representations, determined by the one or more computing devices for the multiple nodes of the second graph corresponding to the node of the first graph, of roles of the multiple nodes in communities to which the multiple nodes belong, a link between the node of the first graph and another node of the first graph.

11. The computer-implemented method of claim 1, comprising generating, by the one or more computing devices, for a node, of the one or more nodes, of the first graph, and based at least in part on representations, determined by the one or more computing devices for the multiple nodes of the second graph corresponding to the node of the first graph, of roles of the multiple nodes in communities to which the multiple nodes belong, a graphical user interface (GUI) depicting the communities to which the multiple nodes belong.

12. The computer-implemented method of claim 1, wherein determining the representation of the role of the node of the multiple nodes in the community to which the node of the multiple nodes belongs comprises determining a numerical embedding in an embedding dimensional space.

13. The computer-implemented method of claim 1, wherein a dot-product between a pair of representations respectively determined by the one or more computing devices for a pair of nodes of the second graph encodes a similarity between the pair of nodes in the second graph.

14. A system comprising:
one or more processors; and
a memory storing instructions that when executed by the one or more processors cause the system to perform operations comprising:
receiving data describing a first graph;
generating data describing a plurality of ego networks comprising, for each node, of one or more nodes, of the first graph, one or more ego networks of the node of the first graph;
partitioning the plurality of ego networks into a plurality of partitions;
generating, based at least in part on the plurality of partitions, a second graph, the second graph comprising, for each node, of the one or more nodes, of the first graph, multiple nodes corresponding to the node of the first graph, each node of the multiple nodes representing an instantiation of the node of the first graph in a community to which the node of the multiple nodes belongs; and
for each node, of the one or more nodes, of the first graph, determining, based at least in part on the data describing the second graph, and for each node of the multiple nodes of the second graph corresponding to the node of the first graph, a representation of a role of the node of the multiple nodes in the community to which the node of the multiple nodes belongs.

15. The system of claim 14, wherein generating the data describing the second graph comprises, for each node, of the one or more nodes, of the first graph, determining, based at least in part on a number of the plurality of partitions comprising the node of the first graph, a number of the multiple nodes corresponding to the node of the first graph to include in the second graph.

16. The system of claim 14, wherein:
the operations comprise determining, for each node, of the one or more nodes, of the first graph and based at least in part on the data describing the first graph, a representation of the node of the first graph in the first graph; and
determining the representation of the role of the node of the multiple nodes in the community to which the node of the multiple nodes belongs comprises determining, based at least in part on the representation of the node of the first graph in the first graph, the representation of the role of the node of the multiple nodes in the community to which the node of the multiple nodes belongs.

17. One or more non-transitory computer-readable media comprising instructions that when executed by one or more computing devices cause the one or more computing devices to perform operations comprising:
receiving data describing a first graph;
generating data describing a plurality of ego networks comprising, for each node, of one or more nodes, of the first graph, one or more ego networks of the node of the first graph;
partitioning the plurality of ego networks into a plurality of partitions;
generating, based at least in part on the plurality of partitions, a second graph, the second graph comprising, for each node, of the one or more nodes, of the first graph, multiple nodes corresponding to the node of the first graph, each node of the multiple nodes representing an instantiation of the node of the first graph in a community to which the node of the multiple nodes belongs; and for each node, of one or more nodes, of the first graph, determining, based at least in part on data describing the second graph, and for each node of the multiple nodes of the second graph corresponding to the node of the first graph, a representation of a role of the node of the multiple nodes in a community to which the node of the multiple nodes belongs.

18. The one or more non-transitory computer-readable media of claim 17, wherein:
- the operations comprise determining, for each node, of the one or more nodes, of the first graph and based at least in part on the data describing the first graph, a representation of the node of the first graph in the first graph; and
- determining the representation of the role of the node of the multiple nodes in the community to which the node of the multiple nodes belongs comprises determining, based at least in part on the representation of the node of the first graph in the first graph, the representation of the role of the node of the multiple nodes in the community to which the node of the multiple nodes belongs.

19. The one or more non-transitory computer-readable media of claim 18, wherein determining the representation of the role of the node of the multiple nodes in the community to which the node of the multiple nodes belongs comprises determining, based at least in part on a parameter that regularizes the degree to which the representation of the role of the node of the multiple nodes in the community to which the node of the multiple nodes belongs can deviate from the representation of the node of the first graph in the first graph, the representation of the role of the node of the multiple nodes in the community to which the node of the multiple nodes belongs.

* * * * *